United States Patent [19]

Sakakibara et al.

[11] Patent Number: 4,690,987

[45] Date of Patent: Sep. 1, 1987

[54] ACTIVATION ENERGY-CURABLE RESIN COMPOSITION

[75] Inventors: Shigeru Sakakibara, Ichihara; Shunji Arimoto, Narashino; Hidenobu Ishikawa, Ichihara; Osamu Maruyama, Chiba, all of Japan

[73] Assignee: Dainippon Ink and Chemicals, Inc., Tokyo, Japan

[21] Appl. No.: 737,254

[22] Filed: May 23, 1985

[30] Foreign Application Priority Data

May 28, 1984 [JP] Japan ................ 59-106530

[51] Int. Cl.$^4$ ............... C08G 8/22; C08G 8/30; C08L 63/04
[52] U.S. Cl. ................... 525/502; 525/504; 525/507; 525/528; 525/530; 525/920; 522/92
[58] Field of Search ............. 525/528, 530, 507, 502, 525/920, 504; 522/92

[56] References Cited

U.S. PATENT DOCUMENTS

| | | | |
|---|---|---|---|
| 4,205,018 | 5/1980 | Nagasawa et al. | 522/92 |
| 4,295,947 | 10/1981 | Ohtani et al. | 525/920 |
| 4,416,750 | 11/1983 | Murphy et al. | 522/92 |
| 4,533,975 | 8/1985 | Bill | 522/92 |

FOREIGN PATENT DOCUMENTS 57-4646 1/1982 Japan.

Primary Examiner—John C. Bleutge
Assistant Examiner—Robert E. L. Sellers, II
Attorney, Agent, or Firm—Sherman and Shalloway

[57] ABSTRACT

An activation energy-curable resin composition comprising as an essential ingredient a resin obtained by reacting (a) the reaction product of a novolac epoxy compound and an unsaturated monocarboxylic acid with (b) the reaction product of a diisocyanate and a poly(meth)acrylate having one hydroxyl group for each molecule.

13 Claims, No Drawings

ACTIVATION ENERGY-CURABLE RESIN COMPOSITION

This invention relates to a novel and useful activation energy-curable resin composition. More specifically, this invention relates to a resin composition, especially suitable for paints, comprising a resin obtained by the reaction of a specified epoxy vinyl ester resin and a specified unsaturated urethane compound as an essential ingredient.

It has been known that coated resin films are cured by irradiating them with an active energy radiation such as ultraviolet light or electron beams. In fact, active research work has been done on coating compositions (such as a paint or a printing ink) containing no solvent or containing a small proportion of solvent and being curable at high speeds at room temperature or active energy-curable materials such as a PS plate (presensitized plate) in order to remove pollution, particularly air pollution by solvent.

For example, Japanese Patent Publication No. 4646/1982 discloses a photocurable resin composition obtained by reacting (A) an ester compound of an epoxy resin obtained by reacting the epoxy resin and an unsaturated hydroxy compound with (B) an isocyanate prepolymer containing an unsaturated bond obtained by reacting an isocyanate compound and an unsaturated hydroxy compound with or without a higher unsaturated fatty acid-substituted trihydric alcohol.

Conventional activation energy-curable resin compositions, however, have the defect of poor curability, heat resistance or solvent resistance because it has a relatively low content of ethylenically unsaturated bonds or in other words, has a low functionality.

The present inventors have now found that when a coated film from a resin composition prepared by reacting a specified epoxy vinyl ester (may be termed an unsaturated vinyl ester prepolymer) obtained from a novolac epoxy compound and an unsaturated monocarboxylic acid with an unsaturated urethane compound (may be termed an unsaturated urethane prepolymer) obtained by reacting a diisocyanate with a hydroxyl group-containing poly(meth)acrylate (to be referred to also as a hydroxyl-containing polyfunctional poly(meth)acrylate hereinafter) and optionally a monofunctional hydroxyl group-containing mono(meth)acrylate such as betahydroxyethyl (meth)acrylate, and adding a photopolymerization initiator, a solvent, etc. to the resulting resin is irradiated with an activation energy radiation, a cured film having much better properties such as curability, heat resistance and solvent resistance than those obtained from the conventional compositions can be obtained.

Thus, according to this invention there is provided an activation energy-curable resin composition comprising as an essential ingredient a resin obtained by reacting (a) the reaction product of a novolac epoxy compound and an unsaturated monocarboxylic acid with (b) the reaction product of a diisocyanate and a poly(meth)acrylate having one hydroxyl group for each molecule.

Typical examples of the novolac epoxy compound include phenol-novolac epoxy resins and cresol-novolac type epoxy resins obtained by the addition reaction of a phenol/formaldehyde polycondensate or polycondensation products of alkylphenols having 1 to 9 carbon atoms in the alkyl moiety and formaldehyde, with epichlorohydrin or betamethylepichlorohydrin.

Suitable novolac epoxy compounds are those which have 3 to 8 phenol nucleus residues. Those having less than 3 phenol nucleus residues tend to require a longer time for curing the surface of a coated film. Those having more than eight phenol nucleus residues are liable to gel during urethanization, and even if no gellation occurs, a large amount of a reactive diluent is required in order to retain the coatability of a paint prepared from the resulting resin composition. Consequently, the curability or heat resistance of the resin is reduced, and thus, the advantage obtainable by using the novolac epoxy compound is lost.

When a polyfunctional bisphenol epoxy resin having a pendant hydroxyl group is used, the curability or heat resistance of the resulting resin composition is inferior to that obtained by using the various novolac epoxy compounds exemplified above. This, however, does not preclude the use of a small amount of the polyfunctional bisphenol epoxy resin having a pendant hydroxyl group in combination with the novolac epoxy compound.

Typical examples of the unsaturated monocarboxylic acid are acrylic acid, methacrylic acid, crotonic acid and cinnamic acid. Two or more of them may be used as a mixture. The use of acrylic acid is especially suitable.

In preparing the reaction product (a) of the novolac epoxy compound and the unsaturated monocarboxylic acid, the suitable proportions of the compounds to be reacted are such that the equivalent ratio of the epoxy group

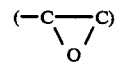

of the epoxy compound to the carboxyl group (—COOH) of the monocarboxylic acid becomes 1.0–1.7:1.0. If the equivalent ratio is less than 1.0:1.0 or in other words, the amount of the carboxyl group is larger, the unreacted unsaturated monocarboxylic acid undesirably remains in the resulting product (a). If the equivalent ratio exceeds 1.7:1.0 or in other words, the amount of the epoxy group is larger, the reaction product (a) becomes unstable and undesirably undergoes gelling during the reaction.

Typical examples of the polyfunctional hydroxyl-containing poly(meth)acrylate include pentaerythritol triacrylate, dipentaerythritol pentacrylate, trimethylolpropane diacrylate, glycerol diacrylate and tris(hydroxyethyl)isocyanurate diacrylate and polymethacrylates corresponding to the aforesaid polyacrylates. These compounds may be used singly or in combination.

When it is not possible to obtain the polyfunctional hydroxyl-containing poly(meth)acrylate in pure form, there can be used, for example, a mixture containing pentaerythritol tri(meth)acrylate as a main component and pentaerythritol di(meth)acrylate or pentaerythritol mono(meth)acrylate as a subsidiary component instead of pure pentaerythritol tri(meth)acrylate.

Typical examples of the diisocyanates include diisocyanate monomers such as 2,4- or 2,6-tolylene diisocyanate, xylylene-1,4-diisocyanate, hydrogenated xylylene-1,4-diisocyanate, hexamethylene diisocyanate, isophorone diisocyanate, diphenylmethane diisocyanate, toluidine diisocyanate and lysine diisocyanate; and isocyanate-terminated reaction products (urethane prepolymers) of these diisocyanate monomers and conventional known diols.

Polyisocyanates having three or more isocyanate groups, such as "Desmodur L-75" (a trademark for a trioldiisocyanate adduct manufactured by Bayer AG, West Germany) are liable to induce gellation in the reaction with the reaction product (a). But it may be used in a small amount in combination with the diisocyanate exemplified above.

In preparing the reaction product (b) by reacting the polyfunctional hydroxyl-containing poly(meth)acrylate with the diisocyanate, these compounds are suitably used in such proportions that the equivalent ratio of the hydroxyl groups (—OH) of the poly(meth)acrylate to the isocyanate groups (—NCO) of the diisocyanate is adjusted to 1.0:2.0 to 1.3:2.0.

If the equivalent ratio is less than 1.0:2.0, or in other words, the amount of isocyanate groups is too large, the excess of the diisocyanate remains in the reaction product (b). Such a reaction product (b) is undesirable because it is liable to gel during the urethanization reaction with the reaction product (a). On the other hand, if the equivalent ratio exceeds 1.3:2.0 or in other words, the amount of the hydroxyl groups is too large, the ratio of a product obtained from one diisocyanate and two polyfunctional hydroxyl-containing poly(meth)acrylate increases. Consequently, the crosslinking sites of the reaction product (b) decrease to exert deleterious effects on the solvent resistance of the resulting resin composition.

The especially preferred equivalent ratio of —OH/—NCO is from 1.0:2.0 to 1.2:2.0.

In this manner, the reaction product, i.e. a compound having isocyanate groups and at least 2 (meth)acryloyloxy groups per molecule (unsaturated ureathane compound), is obtained.

The resin as an essential ingredient of the composition of this invention is prepared by the reaction (urethanization reaction) of the reaction product (a) with the reaction product (b). The reaction can be conveniently carried out by using the reactants in such proportions that the equivalent ratio of the isocyanate groups (—NCO) of the reaction product (b) to the hydroxyl groups (—OH) of the reaction product (a) comes within the range of 1.0:1.0 to 0.1:1.0.

If this equivalent ratio exceeds 1.0:1.0 or in other words, the amount of the isocyanate groups is too large, the free isocyanate groups remain in a large amount in the resulting resin and consequently in the resin composition of this invention. This undesirably reduces the storage stability of the composition of this invention. If this equivalent ratio is less than 0.1:1.0 or in other words, the amount of the isocyanate is too small, the content of ethylenically unsaturated double bonds in the resulting resin and therefore in the resin composition of this invention decreases, and consequently the curability of the resin composition of this invention is reduced.

The especially preferred equivalent ratio is in the range of from 0.8:1.0 to 0.2:1.0. Preferably, the activation energy-curable resin composition of this invention contains at least 5 ethylenically unsaturated bonds on an average per molecule of the resin as an essential ingredient.

Gellation during the urethanization reaction for the preparation of the essential resin component of the composition of this invention can be avoided only when it is carried out stepwise as stated above. If, for example, the reaction product (a), the diisocyanate and the polyfunctional hydroxyl-containing poly(meth)acrylate are simultaneously reacted, or the diisocyanate is reacted with a mixture of the reaction product (a) and the polyfunctional hydroxyl-containing poly(meth)acrylate, gellation tends to occur during the reaction.

The reaction (urethanization reaction) of the reaction product (a) and the reaction product (b) may be carried out in a solvent customarily used in ordinary urethanization reactions. Examples of such a solvent are ethyl acetate, methyl ethyl ketone, toluene, methyl Cellosolve acetate, ethyl Cellosolve acetate, butyl Cellosolve acetate, ethyl carbitol acetate and butyl carbitol acetate. Instead of the solvent, there may be used reactive diluents having no active hydrogen reactive with the isocyanate groups which are selected from reactive diluents customarily used for ordinary activation energy-curable resins. Examples of such reactive diluents are ethylene glycol di(meth)acrylate, 1,6-hexanediol di(meth)acrylate and trimethylolpropane tri(meth)acrylate.

The resin obtained by reacting the reaction product (b) having ethylenically unsaturated double bonds and isocyanate groups obtained by reacting the diisocyanate with the polyfunctional hydroxyl-containing poly(meth)acrylate, with the reaction product (a) having many ethylenically unsaturated double bonds and hydroxyl groups in the molecule obtained by reacting the novolac-type epoxy compound and the unsaturated monocarboxylic acid is very rapidly cured owing to intermolecular crosslinkage when irradiated with an activation energy radiation such as ultraviolet light and electron beams.

The composition of this invention comprises the resulting resin as an essential ingredient. As required, it may further include a (meth)acrylate-type reactive diluent such as trimethylolpropane di(meth)acrylate, trimethylolpropane tri(meth)acrylate, pentaerythritol di(meth)acrylate, pentaerythritol tri(meth)acrylate, pentaerythritol tetra(meth)acrylate, pentaertythritol penta(meth)acrylate, dipentaerythritol tetra(meth)acrylate, dipentaerythritol penta(meth)acrylate, dipentaerythritol hexa(meth)acrylate, 1,6-hexanediol di(meth)acrylate, polyethylene glycol di(meth)acrylate, betahydroxyethyl (meth)acrylate, betahydroxypropyl (meth)acrylate, N-vinyl pyrrolidone, 2-hydroxyethyl (meth)acryloyl phosphate, diethylaminoethyl (meth)acrylate and bis[(meth)acryloyloxyethoxy]bisphenol A; a solvent such as toluene, methyl ethyl ketone, ethyl acetate, isopropanol, ethyl Cellosolve, ethyl Cellosolve acetate, butyl Cellosolve acetate and ethyl carbitol acetate; a stabilizer (polymerization inhibitor) such as hydroquinone, hydroquinone monomethyl ether, 2,6-di-tert-butylhydroquinone, 2,6-di-tert-butyl-4-ethylphenol, tert-butylcatechol or phenothiazine; an inorganic filler such as calcium carbonate, talc or silica; a coloring agent such as phthalocyanine blue or phthalocyanine green; an antifoamer; or a levelling agent.

When the composition of the invention is for curing with ultraviolet light, it must contain a photoreaction accelerator (light sensitizer) for initiating the polymerization of the above resin component by ultraviolet light. Typical examples of such a photoreaction accelerator are benzoin, benzoin methyl ether, benzoin ethyl ether, benzoin formate, 1-hydroxy-1-benzoylcyclohexane, dibutoxyacetophenone, alpha-hydroxy-iso-butyrophenone, p-isopropyl-alpha-methoxyisobutyrophenone, benzyl diphenyl disulfide and azobisisobutyronitrile.

The activation energy-curable resin composition of this invention is applicable as an adhesive for transparent plastic films, a potting material for electrical appliance parts, or a binder for paints or inks (particularly paints or inks for metals, paper, woods or plastics). It is particularly suitable for use as a binder for paints which require heat resistance, solvent resistance or electrical insulation.

Irradiation (light) sources for curing the resin composition of this invention include, for example, solar light, a low-pressure mercury lamp, a medium pressure mercury lamp, a high pressure mercury lamp, a superhigh pressure mercury lamp, a xenon lamp, a halide lamp and an electron beam irradiating device. To aid in curing, a heating means may be separately provided.

The following examples illustrate the present invention more specifically. In these examples, all parts and percentages are by weight unless otherwise specified.

EXAMPLE 1

1.05 Equivalents of a cresol novolac epoxy compound containing 4.5 phenol nucleus residues on an average per molecule and epoxy groups and having an epoxy equivalent of 213 was dissolved in Cellosolve acetate. To this solution were added 1 equivalent of acrylic acid, 0.15 g of hydroquinone and 1.5 g of N,N-dimethylbenzylamine. The mixture was reacted at about 90° C. until the acid value of the reaction mixture reached less than 5. Thus, a reaction product (a) was obtained.

Separately, 0.89 equivalent of isophorone diisocyanate and 0.49 equivalent of pentaerythritol triacrylate were reacted in Cellosolve acetate in the presence of 0.15 g of hydroquinone and 0.03 g of dibutyltin dilaurate at a temperature of 60° C. for about 3 hours to form a product (b).

The reaction product (b) was added to the reaction product (a) and they were reacted at 60° C. for 10 hours.

After the reaction, Cellosolve acetate was added to the product to adjust its nonvolatile content (NV) to 70 %. As a result, there was obtained a resin composition containing 9.9 acryloyloxy groups on an average per molecule.

EXAMPLE 2

1.02 Equivalents of a cresol novolac epoxy compound having an epoxy equivalent of 227 and containing 6 phenol nucleus residues on an average per molecule and epoxy groups was dissolved in Cellosolve acetate. To the solution were added 1 equivalent of acrylic acid, 0.15 g of hydroquinone and 1.5 g of N-dimethylbenzylamine. The mixture was reacted until its acid value reached less than 5. As a result, a product (a) was obtained.

Separately, 1.25 equivalents of toluene diisocyanate and 0.75 equivalent of pentaerythritol triacrylate were reacted in Cellosolve acetate solvent in the presence of 0.22 g of hydroquinone and 0.043 g of dibutyltin dilaurate at a temperature of 60° C. for about 3 hours to form a product (b).

The product (b) was added to the reaction product (a) and they were reacted at 60° C. for 11 hours.

After the reaction, Cellosolve acetate was added to the product to adjust its NV to 70%. As a reuslt, a resin composition containing 15 acryloyloxy groups on an average per molecule was obtained.

EXAMPLE 3

A cresol novolac epoxy compound having an epoxy equivalent of 213 and containing 4.5 phenol nucleus residues on an average per molecule and epoxy groups was dissolved in 1.02 equivalents of Cellosolve acetate, and to this solution was added 1 equivalent of acrylic acid, 0.15 g of hydroquinone and 1.5 g of N,N-dimethylbenzylamine. The mixture was reacted at a temperature of 90° C. until its acid value reached less than 5. A product (a) was thus obtained.

Separately, 0.37 equivalent of dipentaerythritol pentacrylate and 0.67 equivalent of tolylene diisocyanate were reacted in Cellosolve acetate solvent at a temperature of 60° C. for 3 hours in the presence of 0.21 g of hydroquinone and 0.04 g of dibutyltin dilaurate to give a product (b).

The reaction product (b) was added to the reaction product (a), and they were reacted at 60° C. for 10 hours. After the reaction, Cellosolve acetate was added to the product to adjust its NV to 70%. As a result, a resin composition containing 11.3 acryloyloxy groups on an average per molecule was obtained.

EXAMPLE 4

Example 1 was repeated except that methacrylic acid was used instead of acrylic acid. A resin composition containing 9.9 methacryloyloxy groups and acryloyloxy groups on an average in total per molecule was obtained.

COMPARATIVE EXAMPLE 1

1.02 Equivalents of an epoxy resin having a molecular weight of 1,000 and, on an average, 2 epoxy groups and 2.2 hydroxyl groups per molecule and derived from epichlorohydrin and bisphenol A was dissolved in Cellolsolve acetate. To this solution were added 1 equivalent of acrylic acid, 0.29 g of hydroquinone and 2.9 g of N,N-dimethylbenzylamine. The mixture was reacted at a temperature of about 90° C. until its acid value reached less than 5. An esterification product of the epoxy resin containing 4.2 hydroxyl groups and 2 acryloyloxy groups, on an average, per molecule was obtained.

Separately, 4.67 equivalents of tolylene diisocyanate and 2.57 equivalents of beta-hydroxyethyl acrylate were reacted in Cellosolve acetate at a temperature of 60° C. for about 3 hours in the presence of 0.35 g of hydroquinone and 0.07 g of dibutyltin dilaurate to give an unsaturated isocyanate prepolymer.

The unsaturated isocyanate prepolymer was added to the epoxy resin ester, and they were reacted at a temperature of 60° C. for 10 hours.

After the reaction, Cellosolve acetate was added to the solution to adjust its NV to 70%. A resin composition having 6.2 acryloyloxy groups on an average per molecule (control) was obtained.

COMPARATIVE EXAMPLE 2

In the same way as in Comparative Example 1, an epoxy resin ester having 4.2 hydroxyl groups and 2 acryloyloxy groups, on an average, per molecule was obtained.

Separately, 1.11 equivalents of isophorone diisocyanate and 0.61 equivalent of acrylic acid adduct of glycidyl methacrylate (2-hydroxy-1-acryloyloxy-3-methacryloyloxypropane) were reacted at a temperature of 60° C. for about 3 hours in Cellosolve acetate solvent in the presence of 0.13 g of hydroquinone and 0.03 g of dibutyltin dilaurate to give 0.5 equivalent of an unsaturated isocyanate prepolymer.

An amount of the epoxy resin ester which corresponded to 1 equivalent of its hydroxyl groups was taken, and added to 0.5 equivalent of the unsaturated isocyanate prepolymer, and they were reacted at a temperature of 60° C. for 10 hours.

After the reaction, Cellosolve acetate was added to the product to adjust its NV to 70%. A resin composition having 4.1 acryloyloxy groups and 2.1 methacryloyloxy groups, on an average, per molecule (control) was obtained.

APPLICATION EXAMPLES 1–3 AND COMPARATIVE APPLICATION EXAMPLES 1–2

Benzoin isopropyl ether (2.5 parts) was added to 100 parts of each of the resin compositions obtained in Examples 1 to 3 and Comparative Examples 1 and 2 to prepare an ultraviolet light-curable paint. The paint was coated on a tin plate to a thickness of 50 μm and dried.

Prior to ultraviolet irradiation, the coated film was wiped with a gauze impregnated with ethyl acetate. The coated film easily dissolved, and it was confirmed that no curing occurred in the coated film.

The coated film was cured by passing it once, three times or five times under a high pressure mercury (ultraviolet light) lamp having an intensity of 80 W/cm so that it went past a position 15 cm below the lamp at a speed of 10 m/min.

The properties of the cured film were evaluated, and the results are summarized in Table 1.

The properties were evaluated as follows:

Curability

The coated film was wiped ten times with a gauze impregnated with ethyl acetate, and the degree of dissolution of the coated film was visually evaluated. The results are indicated by the following symbols.
◎: No change was observed
○: The surface changed slightly.
Δ: The coated film partly dissolved.
X: The coated film completely dissolved.

HEAT SOFTENING RESISTANCE

The coated film was left to stand in a heating furnace at 280° C. for 20 seconds. Immediately then, a gauze was press-bonded to the coated surface. After cooling, the gauze was peeled off, and the state of the coated film was visually evaluated. The results are shown by the following symbols.
◎: No change was observed.
○: The trace of the gauze was left on the surface
X: The coated film melted and was peeled off together with the gauze.

HEAT DECOMPOSITION INITIATION TEMPERATURE

Determined from a TGA curve obtained by thermogravimetric analysis of the coated film. The thermogravimetric analysis was carried out by heating 10 mg of the sample in air at a temperature elevating rate of 10° C./min. using a measuring instrument of TG/DTA 30 Type made by Seiko Instruments and Electronics Ltd.

APPLICATION EXAMPLE 4

To test the properties required of an electron beam-curable paint, the resin composition obtained in Example 4 was directly coated on a tin plate to a thickness of 50 μm and dried.

Prior to electron beam irradiation, the coated film was tested in the same way as in Application Examples 1 to 3 and Comparative Application Examples 1 and 2. It was confirmed that the coated film did not cure at this stage.

The coated film was then irradiated with electron beams at a dose of 5 Mrads in an oxygen concentration of 300 ppm and at an acceleration voltage of 170 KV.

The properties of the cured film were evaluated, and the results are shown in Table 1.

The results obtained in the foregoing examples demonstrate the excellent curability and heat resistance of the activation energy-curable resin composition of this invention.

In Table, 1. the following abbreviations are used.
AA: acrylic acid
MA: methacrylic acid
IPDI: isophorone diisocyanate
TDI: 2,4-tolylene diisocyanate
PETA: pentaerythritol triacrylate
DPPA: dipentaerythritol pentacrylate
HEA: beta-hydroxyethyl acrylate
GMA-AA: 2-hydroxy-1-acryloyloxy-3-methacryloyloxypropane

TABLE 1

| | | | Application Example | | | | Comparative Application Example | |
|---|---|---|---|---|---|---|---|---|
| | | | 1 | 2 | 3 | 4 | 1 | 2 |
| Resin composition used (prepared in) | | | Example 1 | Example 2 | Example 3 | Example 4 | C. Example 1 | C. Example 2 |
| Structure of the resin composition | Type of the epoxy compound | | | | Novolac type | | | bisphenol A type |
| | Number of phenol nucleus residues | | 4.5 | 6 | 4.5 | 4.5 | | 6 |
| | Unsaturated monocarboxylic acid | | AA | AA | AA | MA | AA | AA |
| | Diisocyanate | | IPDI | TDI | TDI | IPDI | TDI | IPDI |
| | Polyfunctional OH-containing poly(meth)acrylate | | PETA | PETA | DPPA | PETA | HEA | GMA-AA |
| | Epoxy group/carboxyl group equivalent ratio in the preparation of the product (a) | | 1.05 | 1.02 | 1.02 | 1.05 | | 1.02 |
| | OH/NCO equivalent ratio in the preparation of the product (b) | | 1.½ | 1.2/2 | 1.½ | 1.½ | | 1.½ |
| | NCO/OH equivalent ratio in the preparation of the final resin | | 0.4 | 0.5 | 0.3 | 0.4 | | 0.5 |
| | Number of ethylenically unsaturated double bonds per molecule of resin | | 9.9 | 15.0 | 11.3 | 9.9 | 4.1 | 6.2 |
| Properties | Curability | Curing by ultraviolet light | Passed once | | | | — | X | X |
| | | | Passed 3 times | | | | — | Δ | X |
| | | | Passed 5 times | | | | — | | Δ |
| | | Curing by electron beams | — | — | — | | — | — |
| | Heat resistance | Heat softening | Curing with ultraviolet | Passed once | | | | — | X | X |
| | | | Passed 5 times | | | | — | Δ | X |

TABLE 1-continued

| | | | Application Example | | | | Comparative Application Example | |
|---|---|---|---|---|---|---|---|---|
| | | | 1 | 2 | 3 | 4 | 1 | 2 |
| ance | ing resistance | light Curing with electron beams | — | — | — | o | — | — |
| | Heat decomposition initiation temperature (°C.) | Curing with ultraviolet light (passed 5 times) | 324 | 330 | 328 | — | 305 | 300 |
| | | Curing with electron beams | — | — | — | 322 | — | — |
| | Residual ratio at 400° C. in the TGA curve | Curing with ultraviolet light (passed 5 times) | 74.0 | 78.5 | 76.2 | — | 45.5 | 40.2 |
| | | Curing with electron beams | — | — | — | 25.5 | — | — |

What is claimed is:

1. An activation energy-curable resin composition comprising as an essential ingredient a resin obtained by reacting (a) the reaction product of a novolac epoxy compound and an unsaturated monocarboxylic acid with (b) the reaction product of a diisocyanate and a polyacrylate or polymechacrylate ester of a polyol wherein the final structure has one hydroxyl group for each molecule.

2. The composition of claim 1 wherein the reaction product (a) is the reaction product of acrylic or methacrylic acid with a phenol novolac epoxy resin obtained by the addition reaction of a polycondensate of phenol and formaldehyde with epichlorohydrin or beta-methylepichlorohydrin.

3. The composition of claim 1 wherein the reaction product (a) is the reaction product of acrylic or methacrylic acid with an alkylphenol novolac epoxy resin obtained by the addition reaction of a polycondensate of an ($C_1$–$C_9$ alkyl)phenol and formaldehyde with epichlorohydrin or beta-methylepichlorohydrin.

4. The composition of claim 1 wherein the reaction product (a) is the reaction product of a cresol novolac epoxy resin with acrylic or methacrylic acid.

5. The composition of any one of claims 1 to 4 wherein the reaction product (a) is obtained by using a novolac epoxy compound having 3 to 8 phenol nuclei.

6. The composition of any one of claims 1 to 4 wherein the reaction product (a) is obtained by reacting the novolac epoxy compound and the unsaturated monocarboxylic acid in such proportions that the equivalent ratio of the epoxy groups of the former to the carboxyl group of the latter is 1.0–1.7:1.0.

7. The composition of claim 1 wherein the reaction product (b) is a reaction product of at least one polyacrylate or polymethacrylate ester of a polyol wherein the final structure has 1 hydroxyl group per molecule which is selected from the group consisting of pentaerythritol tri(meth)acrylate, dipentaerythritol penta(meth)acrylate, trimethylolpropane di(meth)acrylate, glycerin di(meth)acrylate and tris(hydroxyethyl)isocyanurate di(meth)acrylate with at least one diisocyanate selected from the group consisting of 2,4-tolylene diisocyanate, 2,6-tolylene diisocyanate, xylylene-1,4-diisocyanate, hydrogenated xylylene diisocyanate, hexamethylene diisocyanate, isophorone diisocyanate, diphenylmethane diisocyanate, toluidine diisocyanate and lysine diisocyanate.

8. The composition of claim 1 or 7 wherein the reaction product (b) is obtained by reacting the polyacrylate or polymethacrylate ester of a polyol wherein the final structure has 1 hydroxyl group per molecule and the diisocyanate in such proportions that the equivalent ratio of the hydroxyl groups of the former to the isocyanate groups of the latter is in the range of 1.0:2.0 to 1.3:2.0.

9. The composition of claim 6 wherein the novolak epoxy compound has 3 to 8 phenol nuclei.

10. The composition of claim 1 wherein the resin is obtained by reacting the reactants (a) and (b) in such proportions that the equivalent ratio of the isocyanate groups of the reaction product (b) to the hydroxyl groups of the reaction product (a) is within the range of 1.0:1.0 to 0.1:1.0.

11. The composition of claim 10 wherein the ratio is 0.8:1.0 to 0.2:1.0.

12. The composition of claim 1 which is curable by exposure to ultraviolet light and further comprising a photoreaction accelerator for initiating the polymerization of the resin component by ultraviolet light.

13. The composition of claim 12 wherein the photoreaction accelerator is selected from the group consisting of benzoin, benzoin methyl ether, benzoin ethyl ether, benzoin formate, 1-hydroxy-1-benzoylcyclohexane, dibutoxyacetophenone, alpha-hydroxy-iso-butyrophenone, p-isopropyl-alpha-methoxyisobutyrophenone, benzyl diphenyl disulfide and azobisisobutyronitrile.

* * * * *